US007540345B2

(12) United States Patent
Bigsby et al.

(10) Patent No.: US 7,540,345 B2
(45) Date of Patent: Jun. 2, 2009

(54) TRACTOR HOOD SUPPORT

(75) Inventors: Bryan Duane Bigsby, Clarks Hill, SC (US); Gregory Eugene Childs, Augusta, GA (US)

(73) Assignee: Deere & Company, Moline, IL (US)

( * ) Notice: Subject to any disclaimer, the term of this patent is extended or adjusted under 35 U.S.C. 154(b) by 345 days.

(21) Appl. No.: 11/340,177

(22) Filed: Jan. 26, 2006

(65) Prior Publication Data

US 2007/0169976 A1 Jul. 26, 2007

(51) Int. Cl.
*B62D 25/10* (2006.01)

(52) U.S. Cl. .................... 180/69.21; 180/69.2; 292/339

(58) Field of Classification Search ............. 180/69.21, 180/69.2, 69.22, 69.23; 292/338
See application file for complete search history.

(56) References Cited

U.S. PATENT DOCUMENTS 2,322,630 A 6/1943 Greig .......................... 180/69
2,333,173 A * 11/1943 Gunning .................. 180/69.21
2,549,133 A 4/1951 Scott ........................... 180/69
2,737,254 A 3/1956 Bayley ........................ 180/69
3,225,857 A * 12/1965 De Haan Wolbert et al. ........... 180/69.21
5,136,752 A 8/1992 Bening et al. ................. 16/287
5,193,636 A * 3/1993 Holm ......................... 180/68.1
5,306,053 A 4/1994 Gurusami et al. ........... 292/278
5,339,494 A 8/1994 Esau et al. ..................... 16/294
5,411,109 A 5/1995 Orns .......................... 180/69.2
5,535,846 A 7/1996 Kurtz, Jr. et al. ......... 180/69.21
5,564,514 A 10/1996 Knight .................... 180/69.21
5,803,198 A 9/1998 Baxter et al. ............. 180/69.21
5,826,672 A * 10/1998 Holter et al. ............. 180/69.21
6,213,235 B1 * 4/2001 Elhardt et al. .............. 180/69.2
6,371,231 B1 * 4/2002 Nushii et al. ............. 180/69.21
6,487,754 B1 12/2002 Keen ........................... 16/306
6,609,583 B2 8/2003 Schillaci et al. .......... 180/69.21
6,719,077 B2 4/2004 Connett et al. ........... 180/69.21
6,892,843 B2 5/2005 Schillaci et al. .......... 180/69.21
6,929,279 B2 * 8/2005 Boden ........................ 280/477

* cited by examiner

*Primary Examiner*—Christopher P Ellis
*Assistant Examiner*—Cynthia F Collado

(57) ABSTRACT

A hood support for a tractor includes a bracket attached to an engine compartment under the tractor hood, a rod bent into a U-shaped loop having a pair of ends pivotably mounted to the bracket, and a spring coiled around one of the ends urging the U-shaped loop toward a raised position. A pocket under the tractor hood is dimensioned to receive the U-shaped loop and support the hood in the raised position.

9 Claims, 2 Drawing Sheets

TRACTOR HOOD SUPPORT

FIELD OF THE INVENTION

This invention relates to a support mechanism for a hood which covers a vehicle engine and other components of a vehicle such as an agricultural or industrial tractor.

BACKGROUND OF THE INVENTION

Agricultural and industrial tractors typically have hoods which cover the engine compartment and extend from the operator's station to the front portion of the tractor. Tractor hoods may include a top panel and left and right side panels that are integral, so that the hood may open as a single unit. Tractor hoods traditionally have been sheet metal, but increasingly are made of molded plastic.

Two types of supports are commonly used to hold tractor hoods open for servicing. One type are gas struts or gas springs that provide assistance in raising the hood and contribute to stability of the hood. Gas struts or gas springs are expensive, are prone to failure due to wear and loss of gas charge, and have a variable force as the temperature varies.

The second type are prop rods that extend between the engine compartment and a raised part of the hood. Prop rods may be difficult to use, at least in part because they do not help raise the hood and may be difficult to engage with the hood. Additionally, prop rods engage the hood away from the center of mass of the hood, so they may result in an unstable and sometimes sagging appearance when the hood is propped open.

A need exists for an economical tractor hood support to securely hold a tractor hood in the open position. A need exists for a tractor hood support that is stable and prevents the hood from sagging when it propped open. A need exists for a tractor hood support that is simple and has a low parts count.

SUMMARY OF THE INVENTION

The tractor hood support of the present invention includes a wire loop or bar that pivots between a lowered position and a raised position. In the raised position, the wire loop or bar enters a pocket in the underside of the tractor hood. A spring urges the wire loop or bar to pivot and help move the tractor hood toward the raised position The tractor hood support securely holds the tractor hood in the open, raised position. The tractor hood support is stable and prevents the hood from sagging when it propped open. The tractor hood support is economical, simple and has a low parts count.

DESCRIPTION OF THE PREFERRED EMBODIMENT

Figure 1:
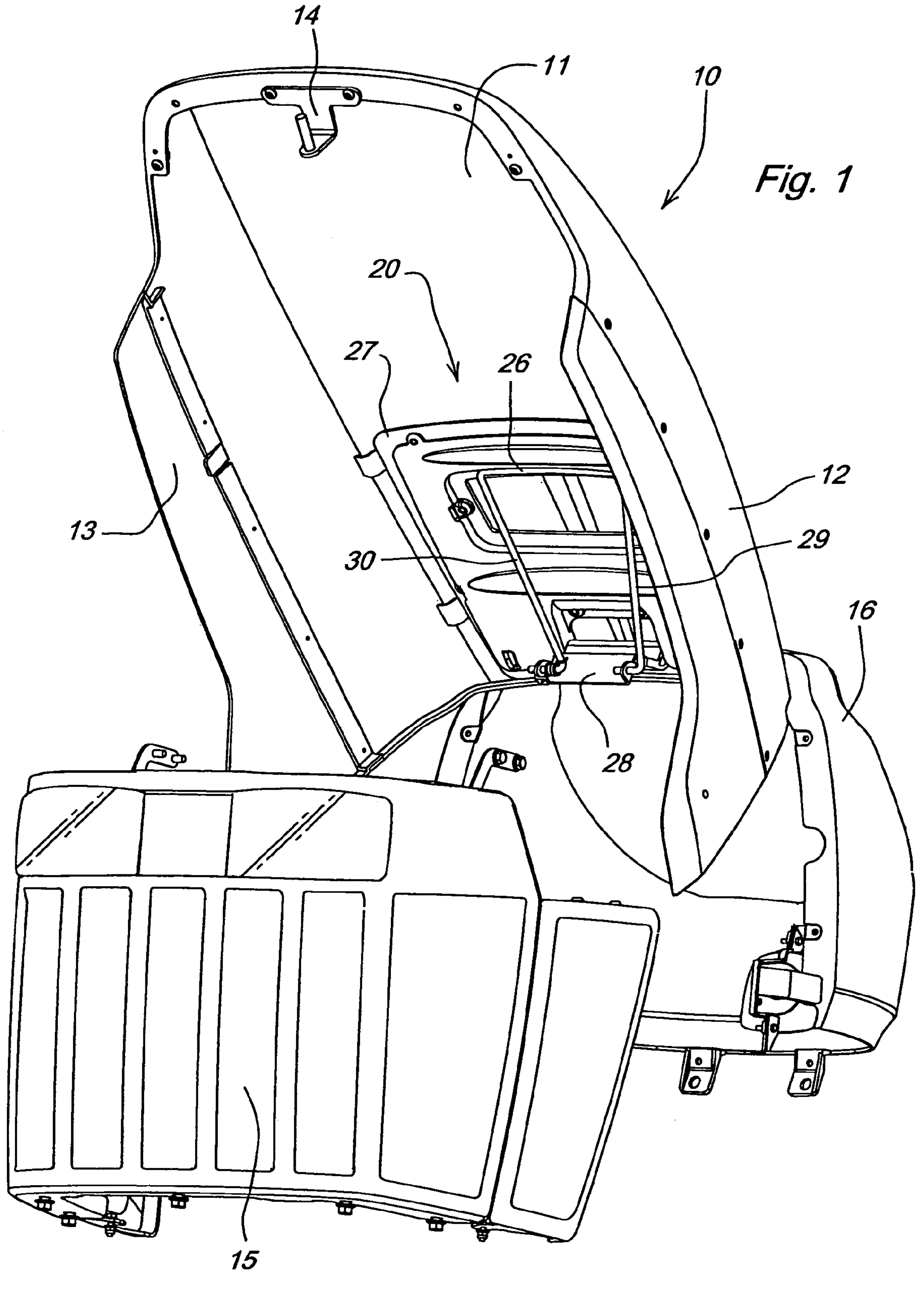
FIG. 1 is a perspective view of an opened tractor hood with a tractor hood support according to one embodiment of the invention.

The tractor hood support of the present invention may be used with tractor hood 10 covering an engine compartment of an agricultural or industrial tractor. As shown in FIG. 1, tractor hood 10 may be a one-piece plastic or sheet metal structure with top panel 11, left panel 12 and right panel 13.

The panels together form an integral one-piece structure enclosing a tractor engine. Latch 14 may be positioned at or under a first end of top panel 11 to releasably hold the hood in a closed position with respect to grille 15.

Figure 2:
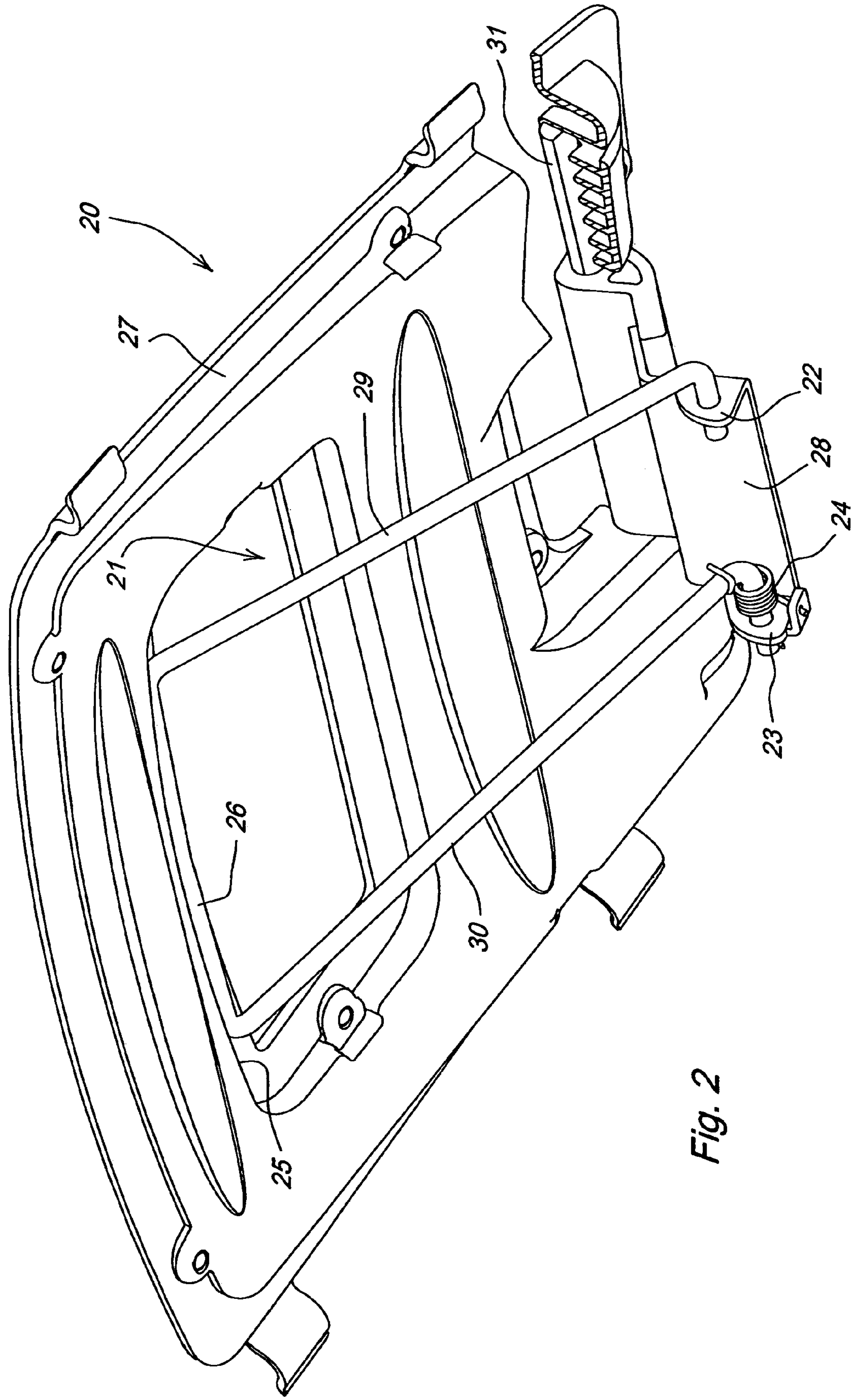
FIG. 2 is a perspective view, partially in section, of the tractor hood support in a first embodiment of the invention.

As shown in FIGS. 1 and 2, tractor hood support 20 may be located at or adjacent a second end of tractor hood 10. Tractor hood support 20 may include a U-shaped wire loop or bar 21 that is pivotably mounted to bracket 28. Bracket 28 may be fixed to the engine compartment under the hood. The wire loop or bar may pivot on a horizontal pivot axis so that the top 26 of the wire loop or bar may detent into pocket 25 under the tractor hood.

In one embodiment, wire loop or bar 21 may be made by bending a cylindrical or non-cylindrical rod into a U-shaped loop. The rod may have a thickness between about ¼ inch and about 1 inch, and a total length between about 1 foot and about 3 feet before bending.

In one embodiment, wire loop or bar 21 may have a pair of ends 33, 34 pivotably mounted to bracket 28. The ends may be pivotably mounted to bracket 28 which is fastened to the engine compartment at a position generally midway or centrally positioned between the left and right panels of tractor hood 10. Wire loop or bar 21 may pivot up when tractor hood 10 is opened to a raised position, and pivot down when the hood is lowered to a stored position. The wire loop or bar may be biased using spring 24 to help urge the tractor hood toward the raised position. When the tractor hood is in the raised position, the wire loop or bar props the hood open, and when the tractor hood is in the lowered or stored position, the wire loop or bar is held underneath the closed hood.

In the raised position, the top 26 of wire loop or bar 21 may detent into pocket 25 under hood top panel 11. Pocket 25 may be located under the hood top panel generally midway or centrally between the left and right panels of the tractor hood, and may have a length of between about 3 inches and about 12 inches between its left and right ends, a width of between about 1 inch and about 12 inches, and a depth of between about ½ inch and about 3 inches. Thus, pocket 26 may have larger dimensions than the top portion 26 of wire loop 21.

In one embodiment, plate 27 may be fastened to the underside of hood top panel 11, and pocket 25 may be a shelf or recess in plate 27. Alternatively, pocket 25 may be a shelf or recess that is integral with the underside of hood top panel 11.

In one embodiment, wire loop or bar 21 may be spring loaded by coil spring 24 to urge it to pivot upward when tractor hood 10 is opened until the wire loop or bar detents into pocket 25. Spring 24 may be a torsion spring which is coiled around the lower end 33 of wire loop or bar 21. Spring 24 may be biased to pivot the wire loop or bar upwardly, thus tending to raise the hood and hold the hood in a raised position.

In one embodiment, wire loop or bar 21 may be generally U-shaped with top portion 26 between a pair of opposing arms 29, 30. The lower ends of arms 29, 30 may be pivotably mounted to bracket 28 by inserting the ends through openings in ears 22, 23 extending from bracket 28. Bracket 28 may be rigidly secured to a frame member in the engine compartment under a second end of hood 10. Bracket also may hold pivot pin 31 that provides a pivot axis and hinge point for the second end of hood 10 to pivot between the open and closed positions.

While the present invention has been described in conjunction with a specific embodiment, it is understood that many alternatives, modifications and variations will be apparent to those skilled in the art in light of the foregoing description.

Accordingly, this invention is intended to embrace all such alternatives, modifications and variations which fall within the spirit and scope of the appended claims.

The invention claimed is:

1. A tractor hood support movable between a lowered position and a raised position, the support comprising:

a one-piece U-shaped wire loop having a top portion between a pair of opposing arms pivotably mounted to a bracket fixed under the tractor hood;

a spring urging the U-shaped loop to an upright position;

a pocket in the tractor hood into which the top portion of the U-shaped loop enters as the tractor hood is in the raised position; and a plate attached to the tractor hood, the pocket being a recess in the plate.

2. The tractor hood support of claim 1 further comprising a pivot pin for the tractor hood extending through the bracket fixed under the tractor hood.

3. An apparatus comprising:

a bracket attached to an engine compartment under a tractor hood;

a rod bent into a U-shaped loop having a top portion between a pair of ends pivotably mounted to the bracket;

a spring coiled around one of the ends urging the U-shaped loop toward a raised position;

a pocket under and generally midway across the tractor hood where the top portion of the U-shaped loop enters as the hood is moved toward the raised position;

wherein the pocket is a recess in a plate mounted to the tractor hood.

4. The apparatus of claim 3 further comprising a hinge pin for the tractor hood extending through the bracket.

5. The apparatus of claim 3 wherein the tractor hood is a molded plastic structure with an integral top panel, left panel and right panel.

6. A tractor hood support comprising:

a bracket fixed to the engine compartment;

a tractor hood hinged to the bracket and movable between a closed position and a raised position; the tractor hood having an underside with a plate mounted thereto and a recess in the plate extending at least about three inches across the underside of the hood; and a one-piece U-shaped wire loop pivotably mounted to the bracket and having a top portion extending along and detenting into the recess in the plate while the tractor hood is raised to support the tractor hood in the raised position.

7. The tractor hood support of claim 6 further comprising a spring urging the U-shaped wire loop to pivot and move the tractor hood toward the raised position.

8. The tractor hood support of claim 6 wherein the tractor hood includes a top panel integral with a left side panel and right side panel; and the recess in the plate is centrally positioned under the top panel between the left and right side panels.

9. The tractor hood support of claim 6 wherein the recess has a length and width greater than the portion of the U-shaped wire loop that detents into the recess.

* * * * *